United States Patent
Suzuki

[19]

[11] Patent Number: 5,835,553
[45] Date of Patent: Nov. 10, 1998

[54] SEMICONDUCTOR INTEGRATED CIRCUIT HAVING A DIGITAL TEMPERATURE SENSOR CIRCUIT

[75] Inventor: Naoshi Suzuki, Tokyo, Japan

[73] Assignee: NEC Corporation, Tokyo, Japan

[21] Appl. No.: 635,676

[22] Filed: Apr. 22, 1996

[30] Foreign Application Priority Data

Apr. 20, 1995 [JP] Japan ................................ 7-095305

[51] Int. Cl.[6] .................................................. G01K 1/02
[52] U.S. Cl. .................................................. 377/25
[58] Field of Search ................................... 377/25

[56] References Cited

U.S. PATENT DOCUMENTS

| | | | |
|---|---|---|---|
| 4,531,193 | 7/1985 | Yasuhara et al. | 377/19 |
| 5,359,234 | 10/1994 | Atriss et al. | 377/25 |
| 5,442,669 | 8/1995 | Medin | 377/25 |
| 5,563,928 | 10/1996 | Rostoker et al. | 377/25 |
| 5,638,418 | 6/1997 | Douglass et al. | 377/25 |

FOREIGN PATENT DOCUMENTS

| | | |
|---|---|---|
| 59-132722 | 7/1984 | Japan . |
| 57-110929 | 7/1989 | Japan . |
| 2-147828 | 6/1990 | Japan . |
| 5-99756 | 4/1993 | Japan . |
| 8-264718 | 10/1996 | Japan . |

Primary Examiner—Margaret Rose Wambach
Attorney, Agent, or Firm—Foley & Lardner

[57] ABSTRACT

In a semiconductor integrated circuit, a temperature sensor circuit includes a pulse source for generating a count pulse and a resistor having a resistance changing dependently upon a temperature change. The temperature detecting circuit is configured to convert the change of the resistance of the resistor responding to the temperature change, into the pulse number of the count pulses, in response to each application of a temperature measuring signal having a first frequency, in order to generate a count signal. A counter counts the count signal and accumulates a count value for each temperature measuring signal so as to hold the accumulated count value. The counter outputs the accumulated count value in response to a reset signal having a second frequency lower than the first frequency. The counter is then reset by the reset signal.

7 Claims, 3 Drawing Sheets

11 OUTPUT CIRCUIT

SEMICONDUCTOR INTEGRATED CIRCUIT HAVING A DIGITAL TEMPERATURE SENSOR CIRCUIT

BACKGROUND OF THE INVENTION

1. Field of the invention

The present invention relates to a semiconductor integrated circuit, and more specifically to a semiconductor integrated circuit internally containing a temperature sensor circuit.

2. Description of related art

In semiconductor integrated circuits, if a chip temperature elevates, there occur various problems, including a malfunction caused by reduction in level margins, and a destruction of circuit elements caused by an excessive current attributable to a thermal runaway Therefore, in a semiconductor integrated circuit used in an application having a severe environment temperature condition, it is in some cases that the semiconductor integrated circuit chip internally includes a temperature sensor and has a function of resetting a temperature abnormality occurring circuit by an output signal from the temperature sensor, or of fixing the chip to a minimum electric power consumption.

Examples of a conventional semiconductor integrated circuit internally containing a temperature sensor circuit, are disclosed by Japanese Patent Application Laid-open Publication Nos. JP-A-57-110929 and JP-A-59-132722. These conventional examples of the semiconductor integrated circuit are fundamentally so configured that at least one resistor of four resistors included in a resistor bridge connected between a power supply line and a ground, is formed of a resistor such as a diffused resistor having a dependency to a semiconductor chip temperature, and the semiconductor chip temperature attaining a voltage balance in the resistor bridge, is used as a temperature detecting reference point, so that when the semiconductor chip temperature becomes higher or lower than temperature detecting reference point, a signal of a high level or a low level is outputted.

Referring to FIG. 1A, there is shown a circuit diagram of a first conventional semiconductor integrated circuit shown in JP-A-57-110929. This first conventional semiconductor integrated circuit includes a polysilicon resistor R101 having one end connected to a power supply voltage VD and formed of a polysilicon and having a negative temperature coefficient in a resistance value, a temperature detecting resistor R102 having one end connected to the power supply voltage VD and having a positive or a small negative temperature coefficient in a resistance value, a resistor R103 having one end connected in series with the resistor R101 and the other end connected to ground VS, the resistor R103 being formed of a high resistance diffused resistor and having a positive temperature coefficient in a resistance value, and a resistor R104 having one end connected in series with the resistor R102 and the other end connected to the ground VS, the resistor R104 being formed of a polysilicon, similarly to the resistor R101. The integrated circuit also includes a non-inverting input connected to a common connection node N1 between the resistors R101 and R103, and an inverting input connected to a common connection node N2 between the resistors R102 and R104.

Now, operation of the first conventional semiconductor integrated circuit will be described with FIG. 1A and FIG. 1B showing temperature detecting characteristics. As mentioned above, since the temperature coefficients of the resistance values of the polysilicon resistor R101 and the diffused resistor R103 are negative and positive, respectively, a voltage "n1" of the node N1 has a temperature-to-voltage characteristics as shown by a straight line A1 in FIG. 1B. A gradient or slope of the temperature-to-voltage characteristics is a sum of a gradient of the temperature coefficient of the resistor R101 and a gradient of the temperature coefficient of the resistor R103. On the other hand, since the resistor R102 has a positive temperature coefficient or a negative temperature coefficient which is very small at a degree negligible in comparison with the temperature coefficient of the resistor R104, a voltage "n2" of the node N2 between the resistors R102 and R104 has a temperature-to-voltage characteristics as shown by a straight line B1 in FIG. 1B. Therefore, a crossing point between the lines A1 and B1 is the detecting reference temperature T0. The voltages "n1" and "n2" are supplied to the inverting input and the non-inverting input of the differential amplifier 101. Thus, if an actual temperature is lower or higher than the detecting reference temperature T0, an output OT of the differential amplifier 101 is brought to a low level (L) or a high level (H), respectively. Accordingly, a temperature can be detected. Furthermore, by adjusting the value of the resistance of the temperature detecting resistor R102, it is possible to set a desired detecting reference temperature. For example, if the value of the resistance of the temperature detecting resistor R102 is made large, the voltage of the whole of the straight line B1 drops, so that the detecting reference temperature is set to a temperature T1 which is lower than the temperature T0. To the contrary, if the value of the resistance of the temperature detecting resistor R102 is made small, the detecting reference temperature can be set to a high value.

Referring to FIG. 2, there is shown a circuit diagram of a second conventional semiconductor integrated circuit shown in JP-A-59-132722. This second conventional semiconductor integrated circuit includes a differential amplifier 201 composed of a pair of transistors Q201 and Q202 having their emitter connected in common to each other and their collector connected to a load resistor R205 or R206. A base of the transistor Q201 receives a temperature input voltage VI and a base of the transistor Q202 receives a reference voltage VR, so that the collector of the transistor Q201 generates an output OT indicative of a difference between the temperature input voltage VI and the reference voltage VR. The second conventional semiconductor integrated circuit further includes a constant current source 202 having a current mirror circuit composed of transistors Q203 and Q204 for supplying a constant current to the differential amplifier 201, resistors R201 and R202 series-connected between a power supply voltage VC and ground VS for generating the temperature input voltage VI at a connection node between the resistors R201 and R202, and resistors R203 and R204 series-connected between the power supply voltage VC and the ground VS for generating the reference voltage VR at a connection node between the resistors R203 and R204.

Namely, the second conventional semiconductor integrated circuit is different from the first conventional semiconductor integrated circuit mentioned hereinbefore, in that the resistors R201 to R204 of the temperature detecting resistor bridge are replaced with diffused resistors, which, however, have different controlled impurity concentrations, respectively so that a set of the resistors R201 and R204 have a temperature-to-resistance coefficients different from that of a set of the resistors R202 and R203.

Generally, a resistor formed in an integrated circuit has a temperature-to-resistance coefficient that is dependant upon the impurity concentration thereof, and more specifically, has several hundreds PPM to several thousands PPM per a temperature increase of 1° C. In this example, the resistors R201 to R204 have the temperature-to-resistance coefficient of +500 PPM/°C., and the resistors R202 to R203 have the temperature-to-resistance coefficient of +4000 PPM/°C.

Next, operation of the second conventional semiconductor integrated circuit will be explained with a specific numerical example applied in the circuit shown in FIG. 2. First, for convenience of explanation, in addition to the above mentioned example of the temperature-to-resistance coefficients, the circuit constants are assumed so that the power supply voltage VC=5 V, the resistors R201=R203=8 KΩ, the resistors R202=2 KΩ, and the resistors R204=2.5 KΩ.

Under the above mentioned circuit constants, the reference voltage VR and the temperature input voltage VI at an ordinary temperature are as follows:

VI=VC·R2/(R1+R2)=10/10=1.0 V

VR=VC·R4/(R3+R4)=12.5/10.5=1.19 V

Therefore, since VR>VI, the transistor Q202 is conductive, and the transistor Q201 are off, so that a high level signal is outputted from the output OT.

Next, assuming that the temperature had elevated by 100° C., the respective values of the resistors R201 to R204 change as follows:

R1=2(1+0.004×100)=2.8 KΩ.
R2=8(1+0.0005×100)=8.4 KΩ.
R3=2.5(1+0.0005×100)=2.625 KΩ.
R4=8(1+0.004×100)=11.2 KΩ.

Accordingly, after the temperature had elevated by 100° C.,

VI=1.25 V
VR=0.949 V

Namely, the large-and-small relation between VR and VI is inverted to V1>VR. Thus, the transistor Q201 is conductive, and the transistor Q202 are off, so that a low level signal is outputted from the output OT.

However, the above mentioned first and second conventional semiconductor integrated circuits can detect only whether an actual temperature exceeds one set detecting temperature.

Furthermore, since a temperature detecting circuit of the above mentioned first and second conventional semiconductor integrated circuits are constituted of an analog circuit, a malfunction easily occurs in the case that an circuit of the integrated circuit to be temperature-detected is a digital circuit which intrinsically involves many pulse noises.

SUMMARY OF THE INVENTION

Accordingly, it is an object of the present invention to provide a semiconductor integrated circuit internally containing a temperature sensor circuit, which has overcome the above mentioned defects of the conventional ones.

Another object of the present invention is to provide a semiconductor integrated circuit internally containing a temperature sensor circuit, which can arbitrarily set the detecting temperature.

Still another object of the present invention is to provide a semiconductor integrated circuit internally containing a temperature sensor circuit, which has a high resistance to pulse noises.

The above and other objects of the present invention are achieved in accordance with the present invention by a semiconductor integrated circuit comprising:

a temperature sensor circuit including a pulse source for generating a count pulse and a resistor having a resistance changing dependently upon a temperature change, the temperature detecting circuit being configured to convert the change of the resistance of the resistor responding to the temperature change, into the pulse number of the count pulses, in response to each application of a temperature measuring signal having a first frequency, in order to generate a count signal; and a counter counting the count signal and accumulating a count value for each temperature measuring signal so as to hold the accumulated count value, the counter outputting the accumulated count value in response to a reset signal having a second frequency lower than the first frequency, and the counter being then reset by the reset signal.

The above and other objects, features and advantages of the present invention will be apparent from the following description of preferred embodiments of the invention with reference to the accompanying drawings.

DESCRIPTION OF THE PREFERRED EMBODIMENTS

Figure 1A:
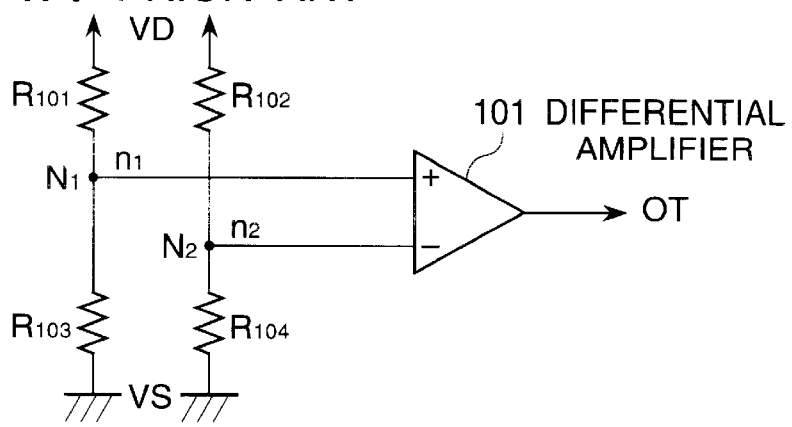
FIG. 1A is a circuit diagram of a temperature detecting circuit of a first conventional semiconductor integrated circuit.
Figure 1B:
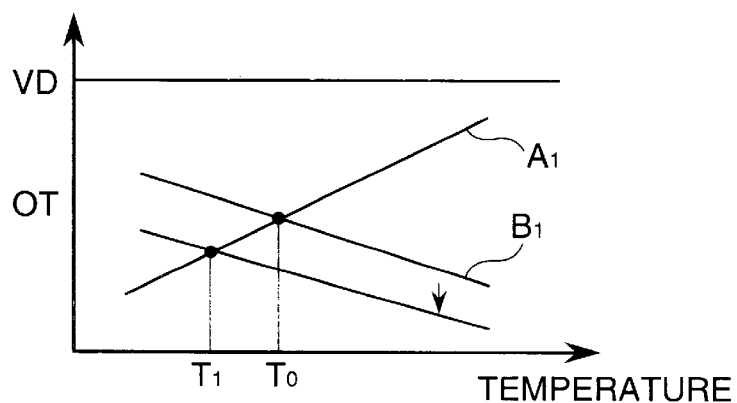
FIG. 1B is a graph showing a temperature detecting characteristics of the circuit shown in FIG. 1A.
Figure 2:
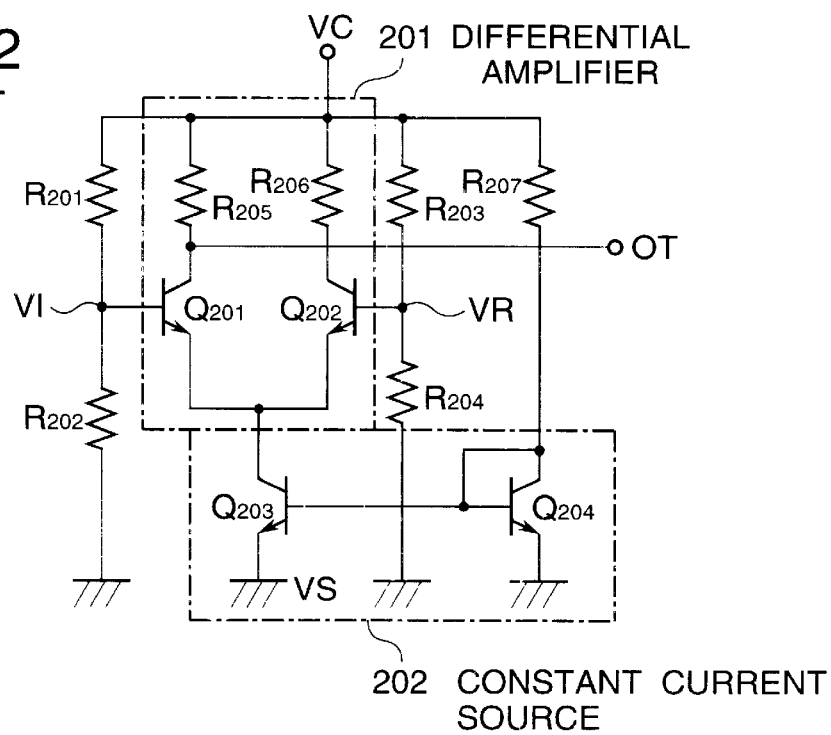
FIG. 2 is a circuit diagram of a temperature detecting circuit of a second conventional semiconductor integrated circuit.
Figure 3:
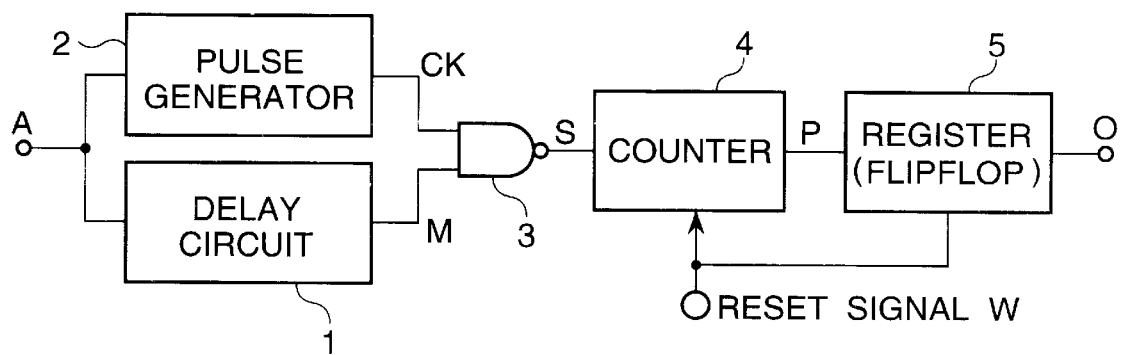
FIG. 3 is a block diagram of a first embodiment of the temperature detecting circuit of the semiconductor integrated circuit in accordance with the present invention.

Referring to FIG. 3, there is shown a block diagram of a first embodiment of the temperature detecting circuit of the semiconductor integrated circuit in accordance with the present invention.

The shown temperature detecting circuit of the semiconductor integrated circuit in accordance with the present invention includes a delay circuit 1 receiving a sampling input signal A in order to perform a temperature measurement at a constant frequency, and composed of a plurality of cascaded unitary circuits each consisting of an inverter and a RC circuit, so as to output a delayed signal M obtained by delaying the sampling input signal A by a delay time depending upon the temperature, and a pulse generator 2 receiving the sampling input signal A for generating a clock signal CK having a predetermined frequency in synchronism with the sampling input signal A, and a gate circuit 3 receiving the clock signal CK and the delayed signal M for allowing the clock signal CK to pass therethrough, as count pulse S, for the delay time of the delayed signal M. The shown temperature detecting circuit also includes a counter 4 counting the count pulse S to generate, accumulate and hold a count value signal until it is reset by a reset signal W, the counter 4 outputting an accumulated count value P in response to the reset signal W, and a register 5 set by the accumulated count value P to output an accumulated count value output O, and reset by the reset signal W.

Figure 4:
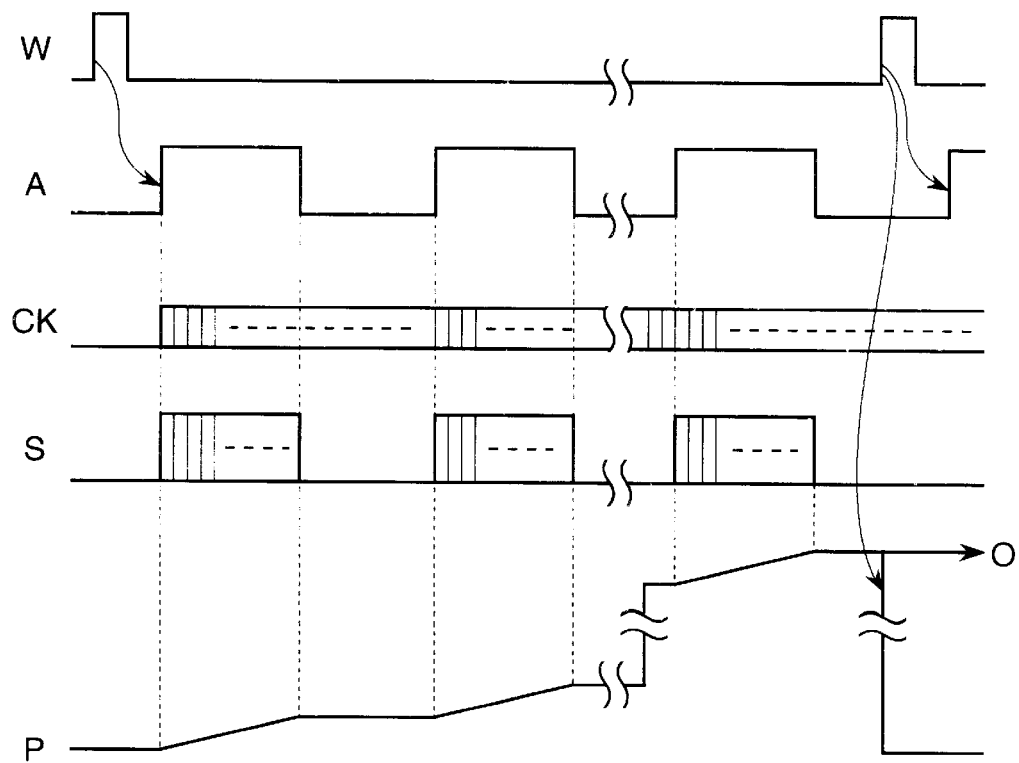
FIG. 4 is a timing chart illustrating an operation of the temperature detecting circuit shown in FIG. 3.

Now, operation of the shown temperature detecting circuit will be explained with FIG. 3 and the timing chart of FIG. 4, First, the delay circuit 1, the pulse generator 2 and the gate circuit 3 constitute a temperature sensor circuit for converting the temperature change into the pulse number. The pulse generator 2 generates the clock CK of the predetermined frequency in synchronism with a leading edge of the sampling input signal A. On the other hand, the delay circuit 1 outputs the delayed signal M obtained by delaying the sampling input signal A by a delay time depending upon the temperature of the integrated circuit chip. The gate circuit 3 is constituted of a NAND circuit in the shown embodiment, and passes the clock CK during a high level period of the delayed signal M, so as to output the passing clock CK as the count pulse. The counter 4 counts the count pulse S, and temporarily hold the count value unless it is reset by the reset signal W.

Namely, until the counter 4 is reset by the reset signal W, the above mentioned operation is repeated at each time the input signal A is applied, so that the count value is accumulated in the counter 4, and an accumulated count value P (as symbolically shown in FIG. 4) is held.

In response to the reset signal W, the counter 4 outputs the accumulated count value P to the register 5, which is formed of for example, a plurality of flipflops connected in a manner well known to persons skilled in the art, and then, the counter 4 is reset. The content of the register 5 is rewritten by the received accumulated count value P in response to the reset signal W. Namely, the register 5 holds the received accumulated count value P until the next reset signal W is applied.

Here, assuming that the frequency of the input signal A is 1 KHz, and a period of the reset signal W is one second, the number of accumulations in the counter 4 is 1000.

Figure 5A:
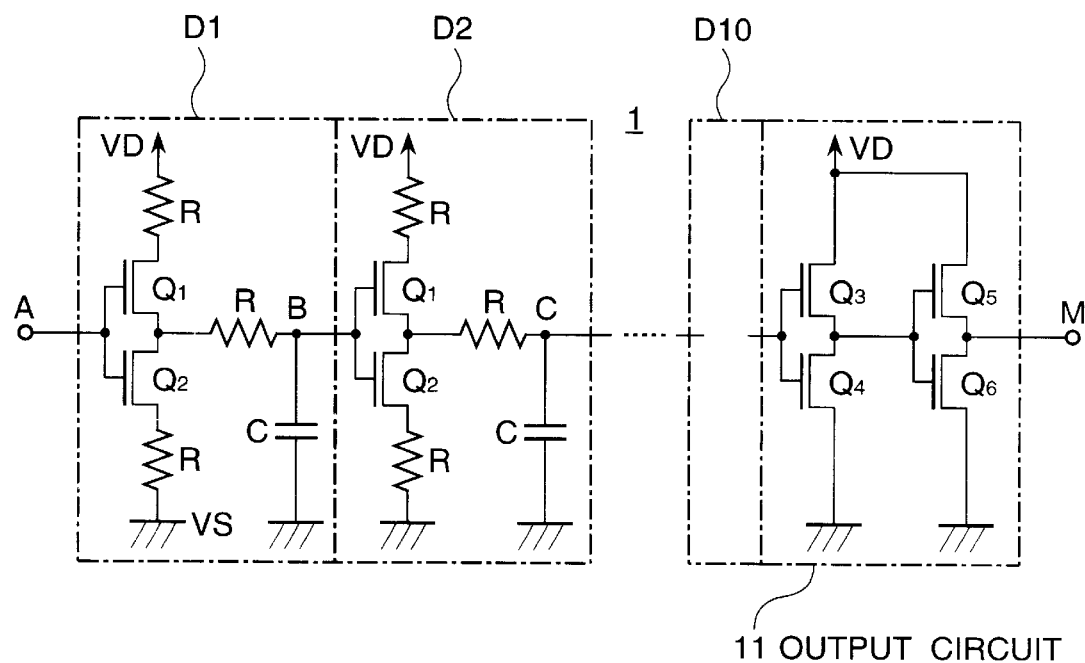
FIG. 5A is a circuit diagram of the delay circuit included in the circuit shown in FIG. 3.

Referring to FIG. 5A showing the construction of the delay circuit 1, the delay circuit 1 includes a plurality of cascaded unitary delay circuits D1, D2, ... D10 each consisting of an inverter having series-connected PMOS transistor Q1 and NMOS transistor Q2 connected through a diffused resistor R between a power supply voltage VD and ground VS, and an RC circuit including a diffused resistor R having one end connected to an output of the associated inverter and a capacitor connected between the other end of the diffused resistor R and the ground. More specifically, the PMOS transistor Q1 has a source connected through the resistor R to the power supply voltage VD, and a drain connected to a drain of the NMOS transistor Q2 and constituting an output of the inverter A source of the NMOS transistor Q2 is connected through the resistor R to the ground. Gates of the PMOS transistor Q1 and the NMOS transistor Q2 are connected to each other so as to constitute an input of the inverter.

The delay circuit 1 also includes an output circuit 11 composed of a pair of cascaded inverters, the first inverter having an input connected to an output of the last unitary delay circuit D10 and composed of PMOS transistor Q3 and NMOS transistor Q4 connected in series between the power supply voltage VD and the ground VS, and the second inventor having an input connected to an output of the first inverter and composed of PMOS transistor Q5 and NMOS transistor Q6 connected in series between the power supply voltage VD and the ground VS and an output connected to output the delayed signal M. This output circuit 11 functions as the pulse shaping.

Figure 5B:
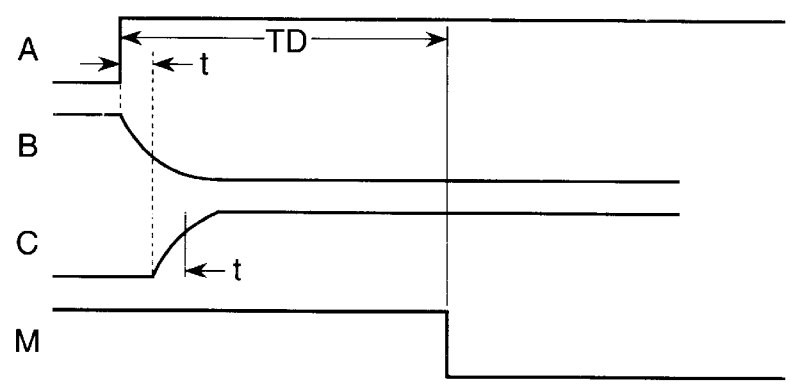
FIG. 5B is a timing chart illustrating an operation of the delay circuit shown in FIG. 4A.

Now, operation of the delay circuit 1 will be described with reference to FIG. 5B showing a timing chart illustrating the operation of the delay circuit 1.

Each of the unitary delay circuits D1 to D10 has a rising and falling characteristics determined by the time constant of the resistor R and the capacitor C of the RC circuit, and therefore, output a signal starting to change in response to a leading edge of the input signal and having a leading waveform in accordance with the above mentioned rising and falling characteristics. The inverter of the next stage unitary delay circuit starts to operate when an input voltage reaches an inverter operation threshold determined by threshold of the transistors Q1 and Q2 and the power supply voltage. Therefore, the preceding unitary delay circuit gives a unitary delay time "t" corresponding to a time from the moment the input signal is applied to the moment the output voltage of the preceding unitary delay circuit reaches the inverter operation threshold of the next stage unitary delay circuit Therefore, as shown in FIG. 5B, the output signals B and C of the unitary delay circuits D1 and D2 are delayed from the input signals A and B by the unitary delay time "t", and therefore, since the ten unitary delay circuits D1 to D10 are used in the shown embodiment, the delay time TD of the delay circuit 1 becomes 10t.

As explained hereinbefore in connection with the prior art, the diffused resistor R has a resistance-to-temperature characteristics (temperature coefficient of resistance) depending upon the impurity concentration. Therefore, by suitably setting this resistance-to-temperature characteristics, it is possible to use the delay circuit 1 as a temperature detecting means.

In the following, explanation will be made with reference to a specifics numerical example.

An output voltage V(t) of the RC circuit when a stepped signal is applied, can be expressed as follows:

$$V(c) = VD\{1 - \exp(-t(CR_D))\}$$

Here, assume that, at an ordinary temperature of 25° C., the resistance $R_D = 2R = 100$ KΩ, the capacitance C=1 pF, the temperature coefficient of the resistance R is +4000 PPM/°C., and the power supply voltage VD=5 V, the unitary delay time "t" can be expressed as follows:

$$t = 0.233 \times CR_D = 22.3 \text{ ns}$$

If the temperature has elevated by 100° C. and reached to 125° C., the resistance RD increases 40%, and in this case, it becomes unitary delay time "$t_{125}$"=31.2 ns.

Therefore, the change Δt of the delay time caused by the above mentioned temperature change becomes as follows:

$$\Delta t = 8.9 \text{ ns}$$

Therefore, the delay circuit 1 composed of the ten cascaded unitary delay circuits D1 to D10 has a total delay time increase of 89 ns caused by the above mentioned temperature change. In other words, the falling tail edge of the delay signal M is delayed by 89 ns in comparison with the ordinary temperature. This delay time increase of 89 ns caused by the temperature change, corresponds to 8.9 pulses, and hence, to 8.9 of the count value of the counter 4. Accordingly, the 1000 count values are accumulated as mentioned hereinbefore, the accumulated count value P increases by 8900 in comparison with the ordinary temperature. In other words, the temperature elevation per one count value in the accumulated count value P is expressed as follows:

$$100° \text{ C.}/8900 \text{ (counts)} \approx 0.012° \text{ C./count}$$

Namely, a temperature resolution is very excellent.

As mentioned above, the shown embodiment can quantitatively detect a temperature change as a digital value.

Furthermore, in the above mentioned description of the embodiment, the count value of each one reset period is the same value as an ideal case. In fact, however, the count value varies or fluctuates due to various influences including noises. But, since the above embodiment is configured to obtain a total of the one thousand samplings, an averaged value can be obtained always, so that disturbance caused by the noises can be very effectively suppressed. By converting this degree of the noise suppression, improvement of 60 dB can be expected as follows:

$$20 \log_{10} (100 S/N) = 60 \text{ dB}$$

Namely, the S/N factor can be remarkably improved.

The invention has thus been shown and described with reference to the specific embodiments. However, it should be noted that the present invention is in no way limited to the details of the illustrated structures but changes and modifications may be made within the scope of the appended claims.

For example, the delay circuit can be constituted of monostable multivibrators in place of the inverters, and a similar effect can be obtained in this case. In addition, the number of the unitary delay circuits can be freely set, without being limited to 10, and similarly, the clock frequency, the input signal frequency and the reset period can be freely selected.

I claim:

1. A semiconductor integrated circuit comprising:

a temperature sensor circuit including a pulse source for generating a count pulse and a resistor having a resistance changing dependently upon a temperature change, said temperature sensor circuit being configured to convert the chance of the resistance of said resistor responding to said temperature change into a count pulse signal representative of said temperature chance in response to a temperature measuring signal having a first frequency; and a counter counting said count pulse signal and accumulating a count value of said count pulse signal, said counter outputting and resetting the accumulated count value in response to a reset signal having a second frequency lower than said first frequency, wherein said temperature sensor circuit includes:

a delay circuit having an RC time constant circuit composed of said resistor and a capacitor, said delay circuit outputting a delayed signal that includes a delay of said temperature measuring signal by a time corresponding to the time constant of said RC time constant circuit;

a clock generator for generating a clock signal of a third frequency higher than said first frequency, in synchronism with said temperature measuring signal; and a gate circuit receiving said delayed signal and said clock signal, for generating said count pulse signal by passing said clock signal until said delayed signal is received.

2. A semiconductor integrated circuit claimed in claim 1 wherein said delay circuit includes an inverter consisting of series-connected first and second MOS transistors connected in series through said resistor between first and second power supply voltages, and said RC time constant circuit is connected to receive an output of the inverter.

3. A semiconductor integrated circuit claimed in claim 2 wherein said resistor comprises a diffused resistor having predetermined temperature coefficient.

4. A semiconductor integrated circuit claimed in claim 2 wherein said delay circuit includes a predetermined number of cascaded unitary delay circuits each of which further delays said temperature measuring signal.

5. A semiconductor integrated circuit claimed in claim 1 wherein said resistor comprises a diffused resistor having a predetermined temperature coefficient.

6. A method of sensing a temperature change, said method comprising the steps of:

issuing a temperature measuring signal at a first frequency;

supplying the temperature measuring signal through a temperature sensor circuit including a resistor having a resistance that changes in accordance with the temperature change;

converting a delay of the temperature measuring signal that was supplied through the temperature sensor circuit into a count pulse signal representative of the temperature change;

counting the count pulse signal;

accumulating a count value of the count pulse signal as an accumulated count value; and outputting and resetting the accumulated count value in response to a reset signal having a second frequency lower than the first frequency.

7. A method of sensing a temperature change claimed in claim 6 wherein the step of converting includes the steps of:

generating a clock signal of a third frequency higher than the first frequency, in synchronism with the temperature measuring signal;

supplying the delayed signal and the clock signal to a gate circuit; and passing the clock signal through the gate circuit until the delayed signal is received.

* * * * *